Patented Sept. 19, 1933

1,927,777

UNITED STATES PATENT OFFICE 1,927,777

METHOD OF MANUFACTURING HIGH-VALUED NITROGEN COMPOUNDS

Emil Hene, Berlin, Germany

No Drawing. Application May 28, 1931, Serial No. 540,807, and in Germany June 28, 1930

4 Claims. (Cl. 23—75).

It has been already suggested to produce thiourea by heating cyanamide of calcium at a temperature of 70° C. with ammonia compounds of sulphuretted hydrogen in the presence of ammonium salts of carbonic acid, of sulphuric acid, of oxalic acid and the like.

It is further known to manufacture thiocyanates by heating a mixture of cyanamide of calcium with sulphuretted hydrogen or by heating thiourea at a temperature of 170° C.

These known processes have not met with any commercial or practical success, inasmuch as the manufacture of thiourea and thiocyanates is concerned, because the yields are unsatisfactory or, at any rate, uncertain and unsteady so that these reactions cannot be used for carrying out technical purposes.

The object of the invention is to remedy this defect and to provide a new method for the production of thiocyanates in an efficient and economical manner from cheap parent substances.

Accordingly, the method according to my invention comprises a series of successive steps in which certain predetermined temperatures are maintained. Conformingly the metalcyanamide especially calciumcyanamide or substances containing the same are heated with hydrosulphides of alcali- or earthalcali metals or mixtures thereof with or without sulphur at a temperature below 150°, preferably at 105° C. for about one till two hours; the temperature is after this raised up to about 250° preferably 160°–180° C. The heated product is leached and the thiocyanate recovered from this solution in any appropriate manner.

Instead of the hydrosulphides of alcali- or earthalcalimetals substances generating the same f. i. the hydrates in mixture with sulphur or gas purification mass may be used.

In practice it was found advisable, to add so much water to the initial charge, that the latter will form a crumbly mass prior to the heat treatment.

In case of using gas purification mass the addition of water will be unnecessary, because such masses generally contain a sufficient amount of moisture.

As the process can be carried out in any suitable container or vessel expensive autoclaves may be dispensed with.

The invention may now be illustrated in detail by way of examples.

Example 1

3 parts by weight of calciumcyanamide, 3 parts by weight of a 22% solution of NaSH and 0,9 parts by weight of pulverulent sulphur are carefully mixed to form a pasty mass; that is first heated for about 50 minutes to a temperature of 130° C. and subsequently heated for further 50 minutes at a temperature of 180° C. The formed ammonia gas is collected in any appropriate manner and the residue is leached with water.

Half of the nitrogen of the calcium-cyanamide used will be recovered in the form of NH3, while the other thereof will be quantitatively recovered in the form of thiocyanate of calcium or sodium.

As the final product is hard and solid it can be disintegrated and readily leached. It can also be recovered at once in a pulverulent form by stirring the charge during the treatment.

The lixiviating liquid may be treated in accordance with the usual known precipitation or crystallization methods for the recovery of the pure thiocyanate.

The addition of water should be limited to not exceed beyond 30 to 120% of the quantity of the calciumcyanamide used. Excessive water will bring about undesirable decomposition due to saponification; in case of having added water a little in excess of what is absolutely required, part of the water will be evaporated during the heat treatment so as to not cause any injurious effect.

The hydrosulphide of calcium is of particular value, since the same can be manufactured easily and economically at little expense by mixing and heating lime together with waste sulphur, gas purification mass and the like.

Hydrosulphide of potassium will also give good results.

Small amounts of alcali metal or earth alcali metal compounds may be used to promote the formation of thiourea. The process will be particularly economical in case of utilizing waste lyes resulting from the prussian-blue manufacture and containing considerable proportions of sulphates of alcali metals for the purpose of preparing the initial liquid required in the present process.

Example 2

600 kg. of calciumcyanamide containing 20% of nitrogen are carefully mixed with 1200 litres of a solution of hydrosulphide of calcium the product resulting from the mixing operation being a crumbly mass. The latter is heated for about one hour to and at a temperature of about 105° C.; the temperature is then raised slowly, that is within about two hours, to 180° C. and kept at this degree for about one hour, whereupon the mass will be subjected to lixiviation; the resulting solution contains 200 kg. of thiocyanate of calcium.

A particularly economical modification of carrying the new method into effect consists in using gas purification masses.

*Example 3*

100 gr. of a gas-purification mass derived from gas works and containing about 60 per cent of sulphur and 40 gr. of lime are mixed and moderately heated; 80 gr. of calciumcyanamide containing 20% of nitrogen are added and uniformly distributed in the mixture, whereupon heating is continued for about two hours at a temperature of 100° to 105° C. in order to convert the present nitrogen into thiourea. The thus prepared mixture is further heated slowly, that is in the course of two hours, up to a temperature of approximately 180° C. and subsequently kept at this high temperature for about one hour. In the final step of lixiviation the envolved ammonia will be recovered in the usual manner; the yield of ammonia amounts to more than 10 gr., while the yield of thiocyanate of calcium amounts to about 40 gr.

Having now particularly described and ascertained the nature of my said invention and in what manner the same is to be performed, I declare that, what I claim is:

1. The method of manufacturing thiocyanates consisting in heating metal-cyanamides, especially calciumcyanamide or materials containing the same with hydrosulphides of alcali or earthalcali metals at a temperature below 150° C. for about one till two hours, then raising the temperature up to 250° C., leaching to heated product and recovering from the solution the thiocyanate in any appropriate manner.

2. The method of manufacturing thiocyanates consisting in heating metal cyanamides, especially calciumcyanamide or materials containing the same with hydrates of alcali or earthalcali metals and sulphur at a temperature below 150° C., then raising the temperature up to 250° C., leaching the heated product and recovering from the solution the thiocyanate in any appropriate manner.

3. The method of manufacturing thiocyanates consisting in heating metal-cyanamides, especially calciumcyanamide or materials containing the same with hydrates of alcali or earthalcali metals and gas purification mass at a temperature below 150° C., then raising the temperature up to 250° C., leaching the heated product and recovering from the solution the thiocyanate in any appropriate manner.

4. The method of manufacturing thio-cyanates consisting in heating metal-cyanamides, especially calciumcyanamide or materials containing the same with hydrosulphides of alcali or earth-alcali metals at a temperature of about 105° C. for about one till two hours, then raising the temperature to about 180° C., leaching the heated product and recovering from the solution the thiocyanate in any appropriate manner.

EMIL HENE.